United States Patent [19]

Albizzati et al.

[11] Patent Number: 4,473,660

[45] Date of Patent: Sep. 25, 1984

[54] CATALYSTS FOR THE POLYMERIZATION OF OLEFINS

[75] Inventors: Enrico Albizzati, Arona; Sandro Parodi, Oleggio; Pier C. Barbé, Ferrara, all of Italy

[73] Assignee: Montedison S.p.A., Milan, Italy

[21] Appl. No.: 465,595

[22] Filed: Feb. 10, 1983

[30] Foreign Application Priority Data

Feb. 12, 1982 [IT] Italy .............................. 19623 A/82

[51] Int. Cl.$^3$ .............................................. C08F 4/64
[52] U.S. Cl. .................................... 502/124; 502/123; 502/125; 502/127; 502/129; 502/132; 526/125
[58] Field of Search ............... 502/123, 124, 132, 134, 502/127, 125, 129

[56] References Cited

U.S. PATENT DOCUMENTS

| | | | |
|---|---|---|---|
| 4,107,415 | 8/1978 | Giannini et al. | 502/129 X |
| 4,156,063 | 5/1979 | Giannini et al. | 502/127 X |
| 4,174,299 | 11/1979 | Giannini et al. | 502/123 X |
| 4,226,741 | 10/1980 | Luciani et al. | 502/125 X |
| 4,315,836 | 2/1982 | Albizzatti et al. | 502/124 X |
| 4,331,561 | 5/1982 | Luciani et al. | 502/125 |

*Primary Examiner*—Patrick Garvin

[57] ABSTRACT

Catalysts for the polymerization of olefins, comprising the product of the reaction between:
 (a) an Al-alkyl compound;
 (b) an electron-donor compound capable of reacting with $MgCl_2$ but which is not completely complexed with Al-triethyl at the equivalent point of a potentiometric titration under standard conditions and belonging to particular classes of compounds; and
 (c) a solid comprising a Ti compound having at least a Ti-halogen bond and an electron-donor compound belonging to particular classes of esters, both supported on a Mg halide in active form.

6 Claims, No Drawings

CATALYSTS FOR THE POLYMERIZATION OF OLEFINS

The present invention is concerned with new supported catalysts for the polymerization of olefins $CH_2=CHR$ wherein R is an alkyl radical with 1-4 C atoms or an aryl radical, and of mixtures of said olefins with each other and/or with ethylene.

BACKGROUND OF THE INVENTION

Highly active and stereospecific catalysts for the polymerization of alpha-olefins, obtained by reaction of an Al-alkyl compound and a Si compound having Si—OR, Si—OCOR or Si—NR$_2$ bonds with a solid component comprising a halogenated Ti compound and an electron-donor compound selected from particular classes of esters, both supported on Mg halides in active form, have been disclosed.

THE PRESENT INVENTION

We have now found unexpectedly that it is possible to obtain highly active and stereospecific catalysts without using the silicon compounds described in the previous patent applications, provided that, in place of the silicon compounds, electron-donor compounds are employed belonging to particular classes of compounds, which donor compounds, when reacted under standard conditions, satisfy the criterion of not forming complexes with Al-triethyl but of being reactive towards anhydrous Mg chloride.

Therefore, the catalysts of the invention comprise the product of the reaction between:

(a) an Al-alkyl compound chosen in particular among the Al-trialkyls and the alkyl compounds containing two or more Al atoms linked to each other through oxygen or nitrogen atoms or through SO$_4$ or SO$_3$ groups;

(b) an electron-donor compound, reactive towards MgCl$_2$ but which results not to be completely complexed with Al-triethyl at the equivalent point of a potentiometric titration under standard conditions, and selected from the following classes:
aliphatic and cycloaliphatic, secondary and tertiary monoamines;
aromatic mono- and polyamines;
arylenepolyamines and alkylenepolyamines in which the alkylene group bridging two nitrogen atoms contains at least 2 C atoms;
aromatic heterocyclic compounds containing at least a nitrogen atom in the ring;
aliphatic heterocyclic compounds containing at least two nitrogen atoms in the ring;
amides, imides, imines and hydrazines;
compounds free from Al and/or Si atoms containing at least a M—OC or M—NC bond wherein M is a metal, particularly B, Mg, Zn or Ti;
electron-donor compounds free from M—OC or M—NC bonds (M=metal) and containing one or more O and/or S atoms;
Al compounds containing Al—OC bonds.

(c) a solid comprising a Ti compound containg at least a Ti-halogen bond and an electron-donor compound, both supported on an anhydrous Mg halide in active form, the electron-donor compound being chosen among the following classes of compounds:

(1) mono- and polyesters of saturated polycarboxylic acids in which at least one of the ester carbonyl groups is linked to a tertiary or quaternary carbon atom or to a linear or branched chain with at least 4 carbon atoms;

(2) mono- and polyesters of unsaturated polycarboxylic acids, in which two carboxyl groups are linked to vicinal, double bond-forming carbon atoms and in which at least one of the hydrocarbyl radicals R of the COOR groups is a branched saturated or unsaturated radical with 3-20 carbon atoms or is an aryl or arylalkyl radical with 6-20 carbon atoms;

(3) mono- and diesters of aromatic dicarboxylic acids with the COOH groups in ortho-position, in which at least one of the hydrocarbyl radicals R contains from 2 to 20 C atoms;

(4) mono- and polyesters of aromatic hydroxy compounds containing at least two hydroxyl groups in ortho-position, or esters of hydroxyacids containing at least one hydroxyl group in ortho-position with respect to the carboxyl group;

(5) esters of saturated or unsaturated carboxylic acids RCOOR' in which at least one of the hydrocarbyl radicals R and R' is a branched saturated or unsaturated radical with from 3 up to 20 C atoms or is an arylalkyl radical with 7-20 C atoms or is an acyl radical with 3 up to 20 C atoms linked to the ester carbonyl group directly or through a methylene group and in which the R' radical, when linear, is a hydrocarbyl radical containing from 1 to 20 C atoms;

(6) esters of carbonic acid of formula:

wherein at least one of the hydrocarbyl radicals R, which can be the same or different, is a radical with from 3 up to 20 C atoms;

(7) silicon compounds containing at least one Si—OR or Si—OCOR or Si—NH$_2$ bond, wherein R is a hydrocarbyl radical with 1-20 C atoms.

Representative esters are:

Class 1
Diethyl diisobutylmalonate, diethyl n-butylmalonate, diethyl di-n-butylmalonate, diethyl phenylmalonate, diethyl 1,2-cyclohexanedicarboxylate, dioctyl sebacate and diisobutyl adipate.

Class 2
Di-2-ethylhexyl maleate, diisobutyl maleate, diisobutyl 3,4-furandicarboxylate, di-2-ethylhexyl fumarate and 2-ethylhexyl monomaleate.

Class 3
Diisobutyl 2,3-naphthalenedicarboxylate, di-n-propyl, di-n-butyl, diisobutyl, di-n-heptyl, di-2-ethylhexyl, di-n-octyl, dineopentyl phthalate, monobutyl and monoisobutyl phthalate, ethyl isobutyl phthalate and ethyl n-butyl phthalate.

Class 4
2,3-diacetoxynaphthalene, 1,2-diacetoxybenzene, 1-methyl-2,3-diacetoxybenzene, ethyl benzoylsalicylate and methyl acetylsalicylate.

Class 5

Ethyleneglycol pivalate, 1,4-butanediol pivalate, benzyl and isobutyl pivalate, n-propyl pivalate, ethyl diphenylacetate, isobutyl methacrylate, isobutyl acrylate, ethyl benzoylacetate, isobutyl piruvate and isobutyl trans-3-methoxy-2-butenoate.

Class 6

Diphenyl carbonate.

Preferred esters are: esters of maleic, pivalic, methacrylic, carbonic and phthalic acids.

In preparing component (c) the esters are contacted with the Mg halide in the active form or with the precursor of said halide as preformed compounds, or the esters can be formed in situ by known reactions such as, for instance, esterification between an alcohol or an alcoholate and an acyl halide or between an anhydride or a hemiester of a polycarboxylic acid and an alcohol, or by transesterification.

The esters can be employed in admixture with other donors of known type.

The active anhydrous Mg dihalides constituting the support of component (c) are the Mg dihalides showing, in the X-rays spectrum of component (c) in powder form, a broadening of at least 30% of the most intense diffraction line which appears in the powder spectrum of the corresponding dihalide having a surface area of 1 m$^2$/g, or are the Mg dihalides showing an X-rays spectrum in which said most intense diffraction line is replaced by a halo with its intensity peak shifted with respect to the interplanar distance of the most intense line, and/or are the Mg dihalides having a surface area higher than 3 m$^2$/g.

The measurement of the surface area of the Mg dihalides is carried out on component (c) after treatment with boiling TiCl$_4$ for 2 hours. The value thus found is considered as the surface area of the Mg dihalide.

Very active forms of Mg dihalides are those showing an X-rays powder spectrum in which the most intense diffraction line appearing in the spectrum of the corresponding halide having a surface area of 1 m$^2$/g shows a reduction of intensity and is broadened to form a halo, or are those in which said most intense line is replaced by a halo having its intensity peak shifted with respect to the interplanar distance of the most intense line. In general, the surface area of the above forms is higher than 30–40 m$^2$/g and in particular is comprised between 100 and 300 m$^2$/g.

Active forms are also those obtained from the above described forms by a thermal treatment of component (c) in an inert hydrocarbon solvent and showing in the X-rays spectrum sharp diffraction lines in place of the halos.

In any case, the most intense line of these forms shows a broadening of at least 30% with respect to the corresponding line of the Mg dihalide having a surface area of 1 m$^2$/g. Preferred Mg dihalides are MgCl$_2$ and MgBr$_2$. In general, the water content of the dihalides is lower than 1% by weight.

For Ti halides or Ti halogen-alcoholates and esters, both supported on an active Mg dihalide, is meant the above compounds, which can be fixed chemically or physically on the support and which are not extractable from component (c) by treatment of the same with toluene at 80° C. for 2 hours.

Compounds (b) reactive towards MgCl$_2$ are those which under the standard conditions of the reaction remain fixed on the Mg halide for at least 20% by mols.

Components (a), (b) and (c) are caused to react with each other in any order; nevertheless, components (a) and (b) are preferably premixed before being contacted with component (c).

Component (c) can be premixed with component (a) and/or with component (b). Premixing of (a) and (b) is performed at temperatures usually comprised between room temperature and polymerization temperature.

The pre-reaction of (c) and (b) can be carried out also at higher temperatures. Compound (b) can also be incorporated in and reacted with component (c) itself. Component (b) is made to react in a molar ratio with respect to the halogenated Ti compound supported on component (c) of at least 1, and in a molar ratio with respect to the Al-alkyl compound employed as component (a) lower than 20 and preferably comprised between 0.05 and 0.1. Ratios higher than 1 are employed with compounds not complexing Al-triethyl or complexing it only weakly also under conditions promoting the formation of complexes.

In component (c) the molar ratio between the Mg dihalide and the halogenated Ti compound supported on it is comprised between 1 and 500, and the molar ratio between said halogenated Ti compound and the electron-donor, both supported on the Mg dihalide, is comprised between 0.1 and 50.

The silicon compounds defined in (c) include compounds of general formula:

$$R_m SiY_n X_p$$

wherein:

R is an alkyl, alkenyl, aryl, arylalkyl or cycloalkyl with 1–20 carbon atoms;

Y is an —OR′, —OCOR′ or —NR′$_2$ group in which R′, the same as or different from R, has the same meaning as R;

X is a halogen or hydrogen atom or an —OCOR″ or —NR″$_2$ group in which R″, the same as or different from R′, has the same meaning as R′;

m, n, p are numbers ranging:

m from 0 to 3, n from 1 to 4 and p from 0 to 1;

m+n+p is equal to 4.

Other silicon compounds which can be employed are compounds in which two or more silicon atoms are linked together through oxygen or nitrogen atoms. Examples of such compounds are hexaethoxydisiloxane and symmetrical diphenyltetraethoxydisiloxane:

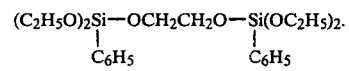

Preferred silicon compounds are: phenyl alkoxy silanes such as phenyl triethoxy and phenyl trimethoxy silane, diphenyl dimethoxy and diphenyl diethoxy silane, monochlorophenyl diethoxy silane; alkyl alkoxy silanes as ethyl triethoxy silane and ethyl triisopropoxy silane.

Examples of other suitable compounds are: chloro triethoxy silane, acetoxy triethoxy silane, vinyl triethoxy silane, butyl triethoxy silane, triphenyl monoethoxy silane, phenyl diethoxy diethylamino silane, tetraphenoxy silane or tetraalkoxy silanes such as tetramethoxy silane.

The silicon compounds can also be formed "in situ" by reaction, for instance, of a halogenated silicon compound, as SiCl$_4$, with an alcohol or a Mg or Al alcoholate.

The electron-donor compounds as defined in (b) do not show, at the equivalent point of the titration test with Al-triethyl, (carried out under the standard conditions indicated hereinafter), any logarithmic variation of potential, i.e., a wave, in the titration curve.

A completely different situation occurs in the case of amines like isoquinoline or esters like ethyl-p-toluate or ethylbenzoate, wherein the titration curve shows a wave at the equivalent point. The absence of a wave at the equivalent point indicates that electron-donor compound (b) is present, at least in part, in non-complexed form with Al-triethyl.

Electron-donor compounds containing active hydrogen atoms reactive towards Al-triethyl, i.e., capable of substitution reaction with Al-triethyl, are prereacted with Al-triethyl, before subjecting the same to the complexation test. In the titration test, the equivalent point is generally referred to the use of 1 mol of Al-triethyl per mol of donor.

Examples of compounds (b) satisfying the above test are: 2,4,6-trimethylpyridine, 2,4,6-trimethylaniline, 2-amino-2-methyl-1-propanol, Al-diethyl(2-amino-2-methylpropoxy), Al-dichloro-phenoxy, Al-monochloro-diphenoxy, Cl$_3$Ti-2,2,6,6-tetramethylpiperidide.

Compounds (b) can be used in mixture, in a wide range, with donors forming complexes with Al-triethyl when titrated according to the test set forth above.

The titration of the mixtures containing significant amounts of the complexing donors, shows the potential variation due to the presence of said complexing donors.

However the polymerization performance of the catalysts obtained by using the above mixtures as component (b) is not significantly reduced by the presence of the complexing donor.

The Al-alkyl compounds constituting the component (a) include the Al-trialkyls, for instance AlEt$_3$, Al(i—Bu)$_3$, Al(i—C$_3$H$_7$)$_3$, AlEt$_2$H, and compounds containing two or more Al atoms linked to each other through hetero-atoms, as: (C$_2$H$_5$)$_2$Al—O—Al—(C$_2$H$_5$)$_2$,

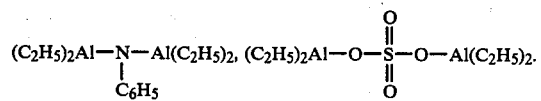

As already indicated, Al-alkyl compounds in which Al atoms are linked through groups like SO$_4$ or SO$_3$ are also suitable.

The Al-alkyl compounds can be employed in admixture with Al-alkyl halides, as AlEt$_2$Cl.

Component (c) is prepared according to known methods. One of these methods consists in co-milling the Mg halide and the electron-donor compound of this invention until there appear in the X-ray spectrum of the milled product the modifications above specified for the spectrum of the Mg dihalide, and in thereafter reacting the milled product with the Ti compound.

Preparations of this type are described in U.S. Pat. Nos. 4,107,413, 4,107,414 and 4,107,415.

Another method consists in reacting an adduct Mg halide/alcohol with a Ti compound in the presence of an electron-donor compound not containing active hydrogen atoms. Said method is described in Belgian Pat. No. 868,682.

According to another procedure, described in the published German Patent Application No. 3,022,738 the adduct Mg dihalide/alcohol is reacted in liquid form with the halogenated Ti compound and with the electron-donor compound.

Other methods are described in published German Patent Application No. 2,924,029, and U.S. Pat. No. 4,220,554.

Another method consists in co-grinding the Mg dihalide, the halogenated Ti compound and the electron-donor compound until activation of the Mg dihalide, and in treating a suspension of the ground product in a halogenated hydrocarbon, as 1,2-dichloroethane, chlorobenzene, methylene dichloride or hexachloroethane.

The treatment is carried out at temperatures comprised between 40° C. and the boiling point of the halogenated hydrocarbon for a time in general ranging from 1 to 4 hours.

According to another procedure, a porous carrier such as SiO$_2$ or Al$_2$O$_3$, having a low content of OH groups (preferably less than 1% by weight), is impregnated with a liquid adduct Mg dihalide/alcohol; thereupon the carrier is treated with an excess of TiCl$_4$ containing in solution the electron-donor compound according to the procedure described, for example, in German Patent Application No. 3,022,738 or in Belgian Pat. No. 868,682.

In all the above mentioned methods the final product contains a Mg dihalide in the active form as hereinbefore defined.

Other known methods for preparing a Mg dihalide in active form or components containing Ti and supported on a Mg dihalide, in which the dihalide is present in the active form, are based on the following reactions:

reaction of a Grignard or of a MgR$_2$ compound (R is hydrocarbyl) or of complexes MgR$_2$/Al-trialkyl with halogenating agents as AlX$_3$ or compounds AlR$_m$X$_n$ (X is halogen, R is hydrocarbyl, m+n=3), SiCl$_4$ or HSiCl$_3$;

reaction of a Grignard compound with a silanol or a polysiloxane, H$_2$O or with an alcohol and further reaction with a halogenating agent or with TiCl$_4$;

reaction of Mg with an alcohol and with a hydrogen halide, or of Mg with a hydrocarbyl halide and with an alcohol;

reaction of MgO with Cl$_2$ or with AlCl$_3$;

reaction of MgX$_2$.nH$_2$O (X is halogen) with a halogenating agent or with TiCl$_4$;

reaction of Mg mono- or dialcoholates or of Mg dicarboxylates with a halogenating agent.

The Ti halides or the Ti halogen-alcoholates include in particular the Ti tetrahalides, the Ti trihalides and the Ti trihalogen-alcoholates. Preferred compounds are: TiCl$_4$, TiBr$_4$, 2,6-dimethylphenoxy-trichloro-titanium.

The Ti trihalides are obtained by known methods, for example by reduction of TiCl$_4$ with Al or with a metallorganic Al compound or with hydrogen.

Preferred catalysts are those in which component (c) is obtained from MgCl$_2$, TiCl$_4$ and esters of maleic, pivalic and phthalic acids, and in which component (b) is 2-amino-2-methyl-1-propanol or Al-dichloro phenoxy.

Component (a) is an Al-trialkyl, as Al-triethyl or Al-triisobutyl.

Component (c) is prepared by the methods described in British Pat. No. 1,559,194, Belgian Pat. No. 868,682, published German Patent Application No. 2,924,029, U.S. Pat. No. 4,220,554, or published German Patent Application No. 3,022,738.

The preferred method for preparing component (c) comprises also the co-grinding of $MgCl_2$, $TiCl_4$ and ester and the treatment of the ground product with a halogenated hydrocarbon, as 1,2-dichloroethane.

The catalysts of the invention are employed for polymerizing the alpha-olefins by known methods, that is by carrying out the polymerization in liquid phase either in the presence or in the absence of an inert hydrocarbon solvent, in gaseous phase or also by combining, for instance, a polymerization step in liquid phase with a step in gaseous phase.

In general, the temperature is comprised between 40° and 160° C., but preferably between 60° and 90° C., while operating either at atmospheric pressure or at higher pressure.

As a molecular weight regulator hydrogen or another regulator of known type is employed.

The catalysts are particularly suitable for the polymerization of propylene, butene-1, styrene and 4-methylpentene-1.

The catalysts can also be employed for polymerizing by known methods mixtures of propylene and ethylene to prepare modified polypropylenes having improved impact resistance at low temperatures (the so-called block copolymers of propylene and ethylene) or to obtain crystalline random copolymers of propylene with minor amounts of ethylene.

The following examples are given only for illustrative purposes and are not intended as limiting in any way the scope of the invention.

The test for the determination of the capability of forming complexes of compound (b) is carried out by the use of a potentiograph Metrohm model E 536 equipped with titration bench E 535, automatic burette E 552, magnetic stirrer E 549 and titration cell EA 880. A combined electrode (Pt//Ag/AgCl/KCl 3M) is employed.

As titrating agent, a 0.5M hexane solution of Al-triethyl is employed which is added to a 0.5M benzene solution of the compound under examination.

It is operated at room temperature in a nitrogen atmosphere.

The test of reactivity of the electron-donor compound with $MgCl_2$ is carried out under the following conditions: into a 500 cc flask are introduced, in a nitrogen atmosphere, 2 g $MgCl_2$ (21 mMoles) suspended in 200 cc toluene and 3.5 mMoles of the electron-donor to be analyzed. It is allowed to react at 25° C. for 1 hour, and the solid is filtered and washed with 200 cc toluene and subsequently with 200 cc n-heptane. The solid is isolated, dried and analyzed.

As $MgCl_2$ is employed the product obtained from $MgCl_2.2.5C_2H_5OH$ by reaction with Al-triethyl, according to the following procedure: into a 3000 cc flask are introduced 2340 cc of a 0.83M hexane solution of $Al(C_2H_5)_3$; while maintaining the temperature below 10° C., little by little are added 136 g $MgCl_2.2.5C_2H_5OH$. After completing the addition, the whole is heated at 70° C. for 4 hours; thereupon it is filtered and the solid is washed several times with n-heptane and is dried under vacuum (0.2-0.5 Torr).

The surface area of the thus obtained $MgCl_2$ is 618 $m^2/g$ and the pores volume 0.532 cc/g.

EXAMPLES 1-4

Preparation of the solid catalyst component and polymerization runs.

The solid adduct $MgCl_2.2.5C_2H_5OH$ was added slowly to a suspension of the complex $TiCl_4$.diisobutyl phthalate in $TiCl_4$ in such a way as to have the following molar ratios: Mg/diisobutyl phthalate=10 and $TiCl_4/C_2H_5OH=10$.

The whole was heated at 100° C. for two hours, $TiCl_4$ was removed by filtration and an equal amount of it was added again, whereupon the whole was allowed to react at 120° C. for two hours. After this time, it was filtered and the resulting solid was washed at 90° C. with n-heptane until disappearance of chloride ions in the filtrate. The solid catalyst component thus obtained, dried under vacuum, showed a titanium content of 2.4% by weight.

Into a stainless steel autoclave of 3000 cc holding capacity, equipped with magnetic anchor stirrer and thermometer, heat stabilized at 60° C., into which propylene was made to flow, was introduced a suspension consisting of 1000 cc anhydrous, deaerated n-heptane, 5 millimoles aluminum-triethyl, the desired amount of electron-donor and the above described solid catalyst component.

Thereupon hydrogen was introduced at a pressure of 0.2 atmospheres and the whole was heated rapidly at 70° C. while feeding in propylene simultaneously up to a total pressure of 7 atmospheres.

Said pressure was kept constant over the whole polymerization time by feeding the monomer in continuously. After 4 hours, the polymerization was stopped and the polymer was isolated by filtration and dried. The amount of polymer dissolved in the filtrate was isolated, weighed and summed to the polymer soluble in boiling n-heptane for the calculation of the isotacticity index (I.I.).

The data concerning the polymerization runs, carried out with the use of various types of electron-donors, are reported in the Table.

TABLE

| Example No. | ELECTRON-DONOR (ED) Type | ED/Al | Yield (gPP/g solid component) | I.T. (%) | $\eta_{inh}$ (dl/g) |
|---|---|---|---|---|---|
| 1 | 2-Amino-2-methyl-1-propanol | 0.5 | 8800 | 80.5 | 1.2 |
| 2 | Succinimide | 1 | 5400 | 84.3 | 1.05 |
| 3 | $AlCl_2(OC_6H_5)$ | 0.3 | 6000 | 85.6 | 1.1 |
| 4 | $Cl_3Ti$ 2,2,6,6-tetramethyl-piperidide* | 0.3 | 8000 | 94 | 1.2 |

*obtained by reaction between the corresponding lithium-amide and $TiCl_4$.

We claim:

1. Catalysts for the (co)polymerization of alpha-olefins $CH_2=CHR$, wherein R is an alkyl radical with 1-4 C atoms or an aryl radical, comprising the product of the reaction between the following components:
   (a) an Al-alkyl compound;
   (b) an electron-donor compound, reactive towards $MgCl_2$ but which results not to be completely complexed with Al-triethyl at the equivalent point of a potentiometric titration under standard conditions, selected from the following classes:
   aliphatic and cycloaliphatic, secondary and tertiary monoamines;

aromatic mono- and polyamines;

arylenepolyamines and alkylenepolyamines in which the alkylene group bridging two nitrogen atoms contains at least 2 C atoms;

aromatic heterocyclic compounds containing at least one nitrogen atom in the ring;

aliphatic heterocyclic compounds containing at least two nitrogen atoms in the ring;

amides, imides, imines and hydrazines;

compounds free from Al and/or Si atoms containing at least a M—OC or M—NC bond wherein M is a metal;

electron-donor compounds free from M—OR or M—NC bonds (M=metal) and containing one or more O and/or S atoms;

Al compounds containing Al—OC bonds, (c) a solid comprising a Ti compound containing at least a Ti-halogen bond and an electron-donor compound, both supported on an anhydrous Mg halide in active form, the electron-donor compound being selected from the following classes of compounds:

(1) mono- and polyesters of saturated polycarboxylic acids in which at least one of the ester carbonyl groups is linked to a tertiary or quaternary carbon atom or to a linear or branched chain with at least 4 carbon atoms;

(2) mono- and polyesters of unsaturated polycarboxylic acids in which two carboxyl groups are linked to vicinal, double bond-forming carbon atoms and in which at least one of the hydrocarbyl radicals R of the COOR groups is a saturated or unsaturated branched radical with 3–20 carbon atoms, or is an aryl or arylalkyl radical with 6–20 carbon atoms;

(3) mono- and diesters of aromatic dicarboxylic acids with the COOH groups in ortho-position, in which at least one of the hydrocarbyl radicals R contains from 2 to 20 C atoms;

(4) mono- and polyesters of aromatic hydroxy compounds containing at least two hydroxyl groups in ortho-position, or esters of hydroxyacids containing at least one hydroxyl group in ortho-position with respect to the carboxyl group;

(5) esters of saturated or unsaturated carboxylic acids RCOOR', in which at least one of the hydrocarbyl radicals R and R' is a saturated or unsaturated branched radical with 3 to 20 C atoms, or is an arylalkyl radical with 7 to 20 C atoms, or is an acyl radical with 3 to 20 C atoms linked to the ester carbonyl group directly or through a methylene group, and in which the R' radical, when linear, is a hydrocarbyl radical containing from 1 to 20 C atoms;

(6) esters of carbonic acid of formula:

wherein at least one of the hydrocarbyl radicals R, which can be the same or different, is a radical with 3 to 20 C atoms;

(7) silicon compounds containing at least one Si—OR or Si—COR or Si—NR$_2$ bond, wherein R is a hydrocarbyl radical with 1–20 C atoms.

2. The catalysts of claim 1, in which compound (a) is selected from the group consisting of Al-trialkyls and Al compounds containing two or more Al atoms linked to each other through oxygen or nitrogen atoms or through SO$_4$ or SO$_3$ groups.

3. The catalysts of claim 1, in which the compound (b) is selected from the group consisting of succinimide, 2-amino-2-methyl-1-propanol, Al-dichloro-phenoxy, Al-monochlorodiphenoxy.

4. The catalysts of claim 1, in which compound (b) is a compound free from Al and Si atoms containing at least a M—OC or M—NC bond in which M is a metal selected from the group consisting of B, Mg, Zn, and Ti.

5. The catalysts of claim 1, in which the Mg halide is MgCl$_2$.

6. The catalysts of claim 1, in which the Mg halide is MgBr$_2$.

* * * * *